(12) United States Patent
Huang

(10) Patent No.: US 9,042,687 B2
(45) Date of Patent: *May 26, 2015

(54) WAVEGUIDE LENS FOR COUPLING LASER LIGHT SOURCE AND OPTICAL ELEMENT

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/918,992

(22) Filed: Jun. 17, 2013

(65) Prior Publication Data

US 2014/0185987 A1  Jul. 3, 2014

(30) Foreign Application Priority Data

Dec. 28, 2012 (TW) .............................. 101151117 A

(51) Int. Cl.
*G02B 6/12* (2006.01)
*G02B 6/124* (2006.01)

(52) U.S. Cl.
CPC .... *G02B 6/12004* (2013.01); *G02B 2006/1204* (2013.01); *G02B 6/1245* (2013.01); *G02B 6/124* (2013.01)

(58) Field of Classification Search
USPC ........................................ 385/1–3, 14–15, 37
See application file for complete search history.

(56) References Cited

U.S. PATENT DOCUMENTS 5,696,856 A * 12/1997 Van Der Tol ................... 385/11
6,078,704 A *  6/2000 Bischel et al. .................. 385/4
6,594,407 B2 * 7/2003 Doi et al. ......................... 385/2

OTHER PUBLICATIONS

"Fresnel lens in a thin-film waveguide" by Ashley et al, Applied Physics Letters, vol. 33, No. 6, pp. 490-492, 1978.*
Comparison of Optical-Waveguide Lens Technologies by Anderson et al., IEEE Journal of Quantum Electronics, vol. QE-13, No. 4, Apr. 1977, pp. 275.*
Achromatic waveguide lenses by Spaulding et al., 2558 Applied Optics / vol. 30, No. 18 / Jun. 20, 1991 pp. 2558.*

* cited by examiner

*Primary Examiner* — Ryan Lepisto
*Assistant Examiner* — Guy Anderson
(74) *Attorney, Agent, or Firm* — Novak Druce Connolly Bove + Quigg LLP

(57) ABSTRACT

A waveguide lens includes a substrate, a planar waveguide formed on the substrate and configured to couple with a laser light source that emits a laser beam into the planar waveguide along an optical axis, and a media grating film including two media gratings with a gap intervening therebetween. Each media grating is symmetrical about a widthwise central axis. Each widthwise central axis and the optical axis are substantially parallel with each other and cooperatively define a plane that is substantially perpendicular to the planar waveguide.

6 Claims, 3 Drawing Sheets

WAVEGUIDE LENS FOR COUPLING LASER LIGHT SOURCE AND OPTICAL ELEMENT

BACKGROUND

1. Technical Field

The present disclosure relates to integrated optics and, more particularly, to a waveguide lens for coupling a laser light source and an optical element.

2. Description of Related Art

Lasers are used as light sources in integrated optics as the lasers have excellent directionality, as compared to other light sources. However, laser beams emitted by the lasers still have a divergence angle. As such, if the laser is directly connected to an optical element, divergent rays may not be able to enter into the optical element, decreasing light usage.

Therefore, it is desirable to provide a waveguide lens, which can overcome the above-mentioned problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
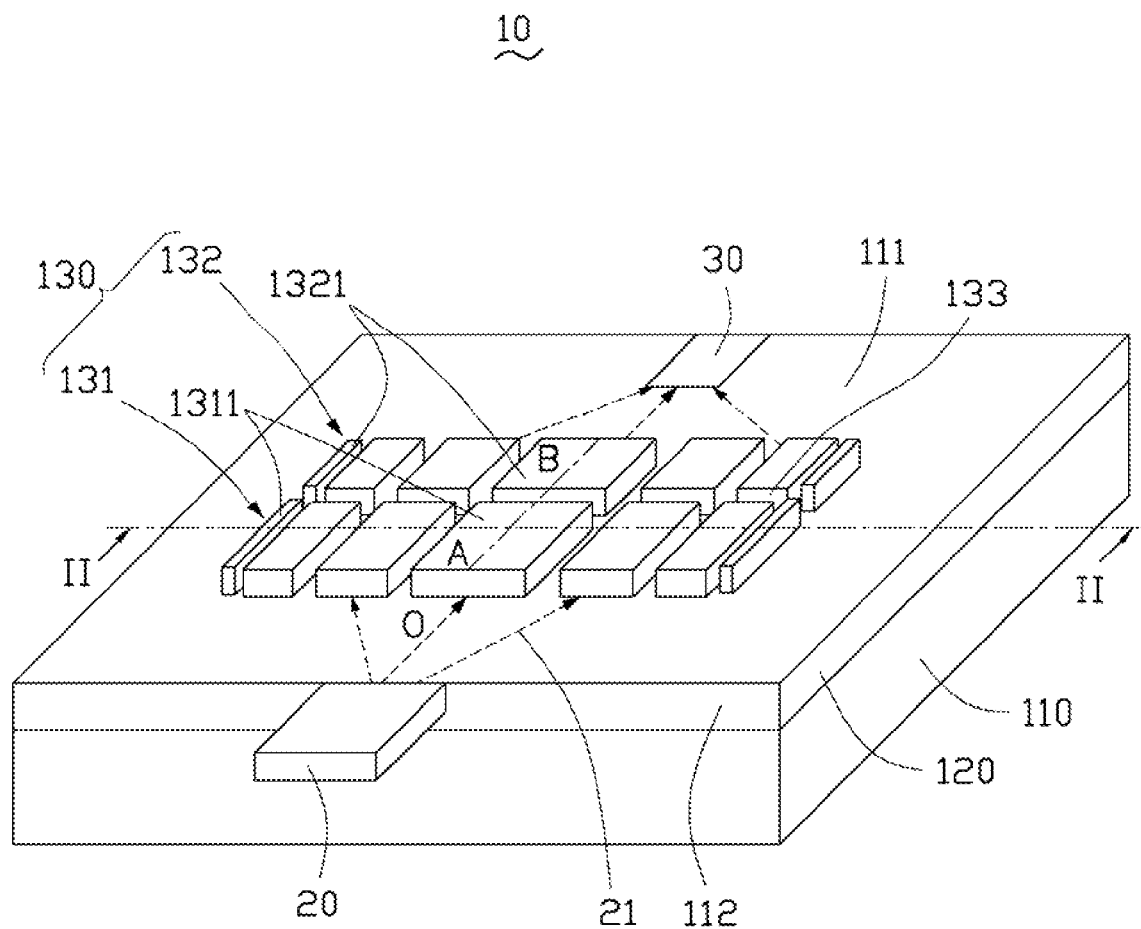
FIG. 1 is an isometric schematic view of a waveguide lens, according to an embodiment.
Figure 2:
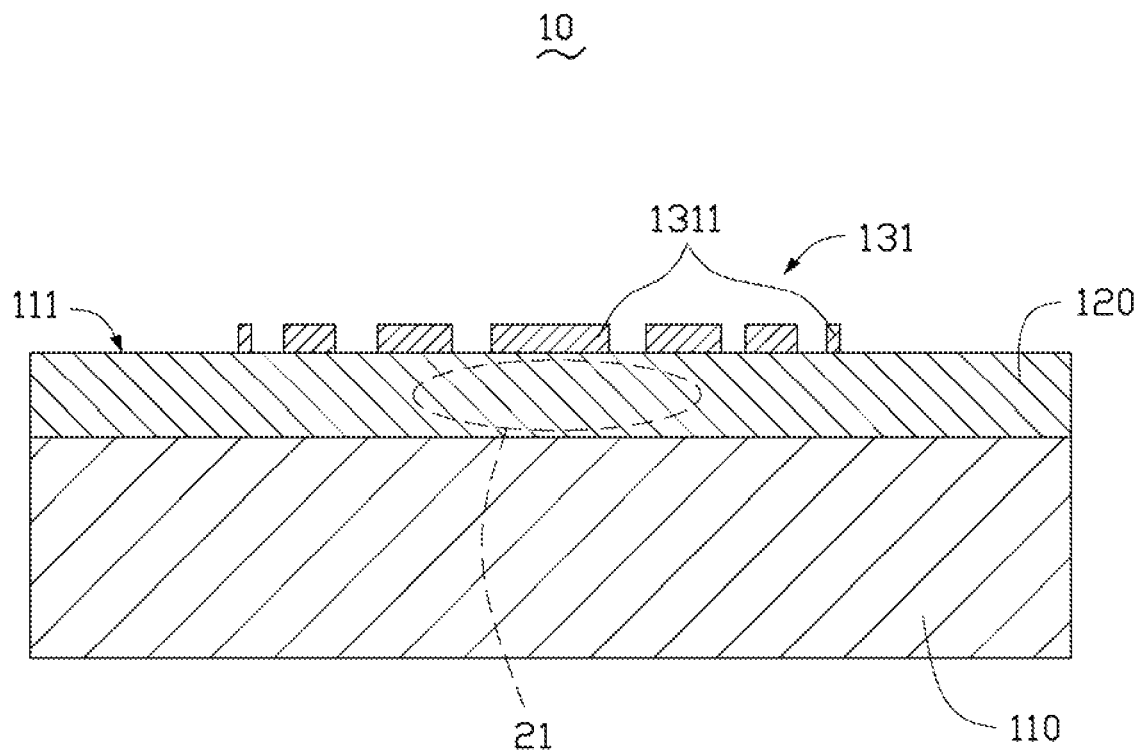
FIG. 2 is a cross-sectional view taken along a line II-II of FIG. 1.

FIGS. 1 and 2 show an embodiment of a waveguide lens 10. The waveguide lens 10 includes a substrate 110, a planar waveguide 120 formed on the substrate 110, and a media grating film 130 formed on the planar waveguide 120.

The substrate 110 is substantially rectangular and includes a top surface 111 and a side surface 112 perpendicularly connecting the top surface 111. In this embodiment, the substrate 110 is made of lithium niobate.

The planar waveguide 120 is formed by coating titanium on the top surface 111 by, for example, sputtering, and then diffusing the titanium into the substrate 110 by, for example, a high temperature diffusing technology. That is, the planar waveguide 120 is made of lithium niobate diffused with titanium, of which an effective refractive index gradually changes when a media is loaded thereon.

The planar waveguide 120 is also rectangular, a upper surface of the planar waveguide 120 is the top surface 111, and a side surface of the planar waveguide 120 is a part of the side surface 112 and configured to couple with a laser light source 20 which emits a laser beam 21 having a divergent angle into the planar waveguide 120 substantially along an optical axis O which is substantially perpendicular to the side surface 112. The laser light source 20 is a distributed feedback laser, and is attached to a portion of the side surface 112 corresponding to the planar waveguide 120 by, for example, a die bond technology.

However, the substrate 110 and the planar waveguide 120 are not limited to this embodiment but can be changed as needed. For example, in other embodiments, the substrate 110 can be made of ceramic or plastic and the planar waveguide 120 can be made of other suitable semiconductor materials such as silicon and dioxide silicon by other suitable technologies.

The media grating film 130 is formed by coating high-refractive material, such as dioxide silicon, dioxide silicon doped with boson or phosphorus, and organic compounds on the planar waveguide 120 by, for example, sputtering, and cutting the high-refractive material using, for example, a photolithography technology, to form a first media grating 131 and a second media grating 132 with a gap 133 intervening between the first media grating 131 and the second media grating 132.

The first media grating 131 can be a chirped grating and has an odd number of first media strips 1311. The first media strips 1311 are symmetrical about a widthwise central axis A of the first media grating 131. The central axis A and the optical axis O are substantially parallel with each other and cooperatively define a plane that is substantially perpendicular to the top surface 111. Each of the first media strips 1311 is rectangular and parallel with each other. In order from the widthwise central axis A to each side, widths of the first media strips 1311 decreases, and widths of gaps between each two adjacent first media strips 1311 also decreases.

Figure 3:
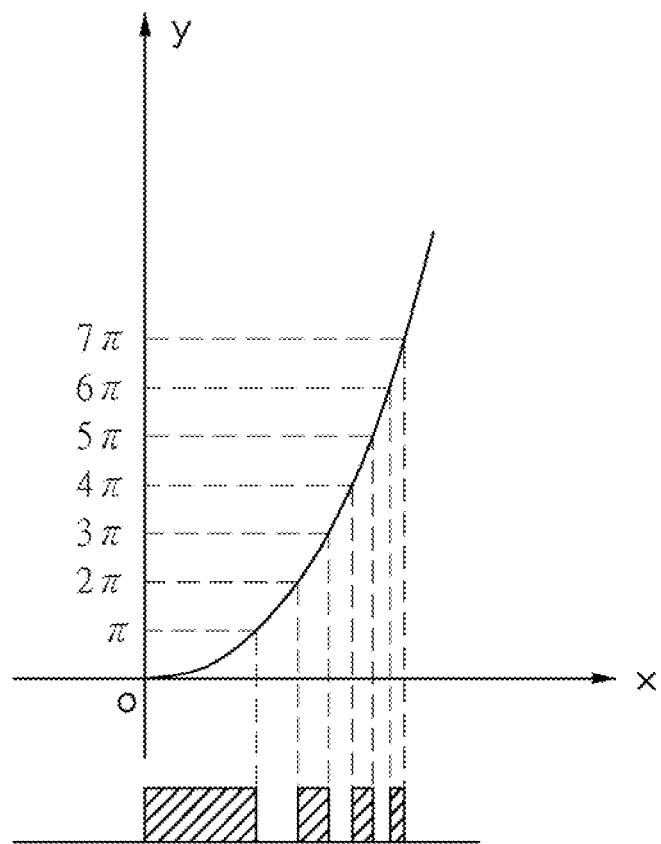
FIG. 3 is a schematic view of a first media grating of the waveguide lens of FIG. 1.

FIG. 3 shows that a coordinate system "oxy" is established, wherein the origin "o" is an intersecting point of the widthwise central axis A and a widthwise direction of the planar waveguide 120, "x" axis is the widthwise direction of the planar waveguide 120, and "y" axis is a phase shift of the laser beam 21 at a point "x". According to wave theory of planar waveguides, $y = a(1 - e^{kx^2})$, wherein $x > 0$, $a$, $e$, and $k$ are constants. In this embodiment, boundaries of the first media strips 1311 are set to conform to conditions of formulae: $y_n = a(1 - e^{kx_n^2})$ and $y_n = n\pi$, wherein $x_n$ is the nth boundary of the first media strips 1311 along the "x" axis, and $y_n$ is the corresponding phase shift. That is, $$x_n = \sqrt{\frac{\ln\left(1 - \frac{n\pi}{a}\right)}{k}} \quad (x_n > 0).$$

The boundaries of the first media strips 113 where $x_n < 0$ can be determined by characteristics of symmetry of the first media grating 131.

The second media grating 132 is structurally identical to the first media grating 131 and includes a number of second media strips 1321 which are symmetrical about a widthwise central axis B. The central axis B and the optical axis O are substantially parallel with each other and cooperatively define a plane that is substantially perpendicular to the top surface 111.

The optical element 30 can be a strip waveguide, an optical fiber, or a splitter.

In operation, the first media grating 131 and the planar waveguide 120 constitute a diffractive waveguide lens to converge the divergent laser beam 21 into a parallel laser beam 21. The second media grating 132 and the planar waveguide 120 constitute a diffractive waveguide lens to converge the parallel laser beam 21 into the optical element 30. As such, usage of the laser beam 21 is increased.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A waveguide lens, comprising:
   a substrate;
   a planar waveguide formed on the substrate and configured to couple with a laser light source that emits a laser beam into the planar waveguide along an optical axis; and
   a media grating film comprising two media gratings with a gap intervening therebetween, each media grating being symmetrical about a widthwise central axis, each widthwise central axis and the optical axis being substantially parallel with each other and cooperatively defining a plane that is substantially perpendicular to the planar waveguide;
   wherein each media grating comprises an odd number of media strips extending along a direction that is substantially parallel with its widthwise central axis, each of the media strips is rectangular;
   a coordinate axis "ox" is established, wherein the origin "o" is an intersecting point of the widthwise central axis and a widthwise direction of the planar waveguide, and "x" axis is the widthwise direction of the planar waveguide, boundaries of the media strips are set to conform condition formulae:

$$x_n = \sqrt{\frac{\ln\left(1 - \frac{n\pi}{a}\right)}{k}},$$

and $x_n > 0$, wherein $x_n$ is the nth boundary of the media strips along the "x" axis, a is a negative constant, and k is a positive constant.

2. The waveguide lens of claim 1, wherein the substrate is made of lithium niobate, ceramic, or plastic.

3. The waveguide lens of claim 1, wherein the planar waveguide is made of lithium niobate diffused with titanium, silicon, or dioxide silicon.

4. The waveguide lens of claim 1, wherein the media grating film is made of a material selected from the group consisting of dioxide silicon, dioxide silicon doped with boson or phosphorus, and organic compounds.

5. The waveguide lens of claim 1, wherein each media grating is a chirped grating.

6. The waveguide lens of claim 1, wherein in the order from the widthwise central axis to each widthwise side of the media grating, widths of the media strips decrease, and widths of gaps between each two adjacent media strips also decrease.

* * * * *